United States Patent [19]

Tatsukami et al.

[11] Patent Number: 4,779,954

[45] Date of Patent: Oct. 25, 1988

[54] PLASTIC OPTICAL FIBER RESISTANT TO HEAT AND HUMIDITY

[75] Inventors: Yoshiharu Tatsukami; Katsuramaru Fujita; Motonobu Furuta, all of Osaka; Toshifumi Tamura, Shiga, all of Japan

[73] Assignee: Sumitomo Chemical Company, Limited, Osaka, Japan

[21] Appl. No.: 65,108

[22] Filed: Jun. 19, 1987

Related U.S. Application Data

[63] Continuation of Ser. No. 667,455, Nov. 1, 1984.

[30] Foreign Application Priority Data

Nov. 2, 1983 [JP] Japan .............................. 58-206649
Dec. 12, 1983 [JP] Japan .............................. 58-234860

[51] Int. Cl.$^4$ ...................... G02B 6/00; C08F 120/18; B32B 27/00; B05D 5/06
[52] U.S. Cl. ............................ 350/96.34; 350/96.30; 526/329.7; 428/394; 427/163
[58] Field of Search ............ 350/96.29, 96.30, 96.31, 350/96.32, 96.34; 428/373, 394, 364; 526/329.7; 427/162, 163; 264/1.5, 1.6

[56] References Cited

U.S. PATENT DOCUMENTS

| | | | |
|---|---|---|---|
| 3,930,103 | 12/1975 | Chimura et al. | 350/96.30 X |
| 4,138,194 | 2/1979 | Beasley et al. | 350/96.30 |
| 4,161,500 | 7/1979 | Schleinitz et al. | 526/329.7 X |
| 4,576,438 | 3/1986 | Tatsukami et al. | 350/96.34 |
| 4,681,400 | 7/1987 | Ueba et al. | 350/96.34 |
| 4,693,553 | 9/1987 | Sasaki et al. | 350/96.34 |
| 4,702,552 | 10/1987 | Takahashi et al. | 350/96.34 X |
| 4,720,428 | 1/1988 | Ohmori et al. | 350/96.34 X |

FOREIGN PATENT DOCUMENTS

51-49415 12/1976 Japan .............................. 350/96.30

OTHER PUBLICATIONS

Publication; Toshikuni Kaino et al; Low Loss Poly (Methylmethacrylate-d8) Core Fibers; Jan. 20, 1983; pp. 567–569.

Primary Examiner—William L. Sikes
Assistant Examiner—Brian M. Healy
Attorney, Agent, or Firm—Birch, Stewart, Kolasch & Birch

[57] ABSTRACT

An optical fiber with low attenuation of light transmission comprising a core and a cladding, wherein the core is made of a polymer comprising units of deuterated methyl methacrylate containing 10 to 40% of a methacrylic ester the ester moiety of which has an alicyclic hydrocarbon group of from 6 to 20 carbon atoms, and the cladding is made of a transparent polymeric material having a refractive index of at least 3% smaller than that of the core, which optical fiber has excellent heat and humidity resistance as well as good flexibility.

13 Claims, No Drawings

PLASTIC OPTICAL FIBER RESISTANT TO HEAT AND HUMIDITY

This application is a continuation of application Ser. No. 667,455 filed on Nov. 11, 1984, now abandoned.

FIELD OF THE INVENTION

The present invention relates to an optical fiber. More particularly, it relates to an optical fiber comprising a core and a cladding and having low attenuation of light transmission.

BACKGROUND OF THE INVENTION

Conventional optical fibers are made from glass materials and widely used as optical signal-transmitting mediums for instrumentation between instruments or in an instrument, for transmission of data, for medical use, for decoration, for transmission of image, etc. However, when their diameters are not sufficiently small, their flexibilities are poor. Further, they are relatively fragile and apt to be broken by impact. Furthermore, they are heavy, because their specific gravity is comparatively large. In addition, the optical fibers themselves as well as their connectors are expensive. Due to these drawbacks, attempt has been made to replace glass materials with plastic materials. The advantages with plastic materials are numerous. For instance, the resulting optical fibers are light, tough and flexible so that their diameters and numerical apertures can be made large. Further, they can be handled with ease and can readily be connected to light emitting and/or accepting elements.

In general, a plastic optical fiber is comprised of a core made of a plastic material having good optical transmission and a cladding made of a plastic material having high transparency wherein the refractive index of the core is larger than the refractive index of the cladding. In this structure, light is transmitted by reflection at the interface between the core and the cladding. The larger the difference in refractive index between the plastic materials of the core and the cladding the better the optical transmission of the optical fiber of the plastic material having good optical transmission, the ones preferred are amorphous plastics of which examples of those preferred are polymethyl methacrylate, polystyrene, etc. (cf. Japanese Patent Publication Nos. 8978/1968 and 21660/1978).

One of the drawbacks of the plastic optical fiber is that its attenuation of light transmission is larger than the glass optical fiber. The attenuation of light transmission through the plastic optical fiber is due to the generation of radio-frequency by infrared absorption vibration between the inherently present carbon-hydrogen bonds. For instance, seven time, six time and five time overtones of the infrared absorption vibration between the carbon-hydrogen bonds of aliphatic hydrocarbons appear at 560 nm, 645 nm and 760 nm, respectively, and seven time, six time and five time overtones of the infrared absorption vibration between the carbon-hydrogen bonds of aromatic hydrocarbons appear at 530 nm, 610 nm and 710 nm, respectively. Tailings of these absorptions increase attenuation at a so-called window of loss.

In order to reduce or eliminate the carbon-hydrogen absorption due to infrared absorption, it is proposed to substitute hydrogen with deuterium. U.S. Pat. No. 4,161,500 and its corresponding Japanese Patent Kokai Publication (unexamined) No. 65555/1979, for example, disclose an optical fiber which contains a core made of deuterated polymethyl methacrylate. This optical fiber has low attenuation of light transmission over a wide range of from visible light to near infrared (cf. T. Kaino, K. Jinguji and S. Nara, *Appl. Phys, Lett.*, 42, 567(1983)). However, the optical fiber which contains the core made of deuterated polymethyl methacrylate is highly hygroscopic. Attenuation increase due to hygroscopicity is unequivocally determined from ambient relative humidity. For example, at relative humidity of 60%, the attenuation of light transmission increase is 550 dB/Km and 450 dB/Km at wavelength of 840 nm and 746 nm, respectively. Therefore, this optical fiber cannot be used in a system utilizing a near infrared light source.

Further, an increase in temperature results in the optical transmission of the plastic optical fiber being greatly reduced. Consequently, this would lessen the reliability of the said fiber as a light signal-transmitting medium. In addition, its resistance to heat is insufficient, thus restricting its use to in transportation vehicles such as automobiles, trains, vessels, aircrafts, robots, etc. The maximum temperature which polymethyl methacrylate and polystyrene can be used is at about 80° C. When used at a temperature higher than about 80° C., they become deformed and their microstructures are altered; thus the function as the optical fiber is impaired. Once they are used at a temperature higher than 80° C., the attenuation of light transmission is high even after cooling to room temperature, and they can only be used within a very restricted temperature range. Accordingly, a plastic optical fiber which has good heat resistance is highly desired.

The applications (U.S. patent appln. Ser. No. 504,861, now U.S. Pat. No. 4,576,438, Canadian Pat. Appln. Ser. No. 430,675 and European Pat. Appln. No. 83 10 5869.8) disclose a heat-resistant optical fiber comprising a core and a cladding, characterized in that the core comprises a core polymer comprising units of a methacrylic ester, of which the ester moiety has an alicyclic hydrocarbon group of not less than 8 carbon atoms, and the cladding comprises a transparent polymeric material having a refractive index of at least 3% smaller than that of the core polymer.

Although this plastic optical fiber has satisfactory heat resistance and flexibility, it is desirable to decrease its attenuation of light transmission over a wide range of from visible light to near infrared and to improve its humidity resistance.

SUMMARY OF THE INVENTION

According to the present invention, there is provided an optical fiber with low attenuation of light transmission and good heat and humidity resistance comprising a core and a cladding, wherein the core comprises a core polymer comprising units of deuterated methyl methacrylate and 10 to 40% of units of a methacrylic ester the ester moiety of which has an alicyclic hydrocarbon group of from 6 to 20 carbon atoms, and the cladding comprises a transparent polymeric material having a refractive index of at least 3% smaller than that of the core polymer.

DETAILED DESCRIPTION OF THE INVENTION

In the comparison with a conventional optical fiber comprising a core made of polymethyl methacrylate, the optical fiber of the present invention is less in attenuation of light transmission with temperature elevation within a range of room temperature to about 80° C., which markedly enhances its reliability. Further, the optical fiber of the present invention, which has the core composed of the core polymer comprising units of deuterated methyl methacrylate and 10 to 40% of units of a methacrylic ester the ester moiety of which has an alicyclic hydrocarbon group of from 6 to 20 carbon atoms, shows little attenuation of light transmission at a high temperature, said temperature being one at which the conventional optical fiber can never be used.

The methacrylic ester to be used in the present invention may be prepared by esterifying methacrylic acid or its chloride with a monohydric alcohol of the formula: ROH wherein R is the above defined alicyclic hydrocarbon group. Specific examples of the monohydric alicyclic alcohol are 1-adamantanol, 2-adamantanol, 3-methyl-1-adamantanol, 3,5-dimethyl-1-adamantanol, 3-ethyladamantanol, 3-methyl-5-ethyl-1-adamantanol, 3,5,8-triethyl-1-adamantanol, 3,5-dimethyl-8-ethyl-1-adamantanol, octahydro-4,7-methanoinden-5-ol, octahydro-4,7-methanoinden-1-ylmethanol, p-menthanol-8, p-menthanol-2, 3-hydroxy-2,6,6-trimethyl-bicyclo[3.1.1]heptane, 3,7,7-trimethyl-4-hydroxy-bicyclo[4.1.0]heptane, borneol, 2-methylcamphanol, fenchyl alcohol, l-menthol, cyclohexanol, dimethylcyclohexyl, 2,2,5-trimethylcyclohexanol, etc. The corresponding methacrylic esters of these monohydric alcohols are preferred. Particularly preferred are bornyl methacrylate, fenchyl methacrylate, l-menthyl methacrylate, adamantyl methacrylate, dimethyladmanthyl methacrylate, etc.

When the methacrylic ester has an aromatic hydrocarbon group in place of the alicyclic hydrocarbon group in the ester moiety, the resulting core greatly increases attenuation of light transmission, thus restricting the application of the optical fiber.

The alicyclic hydrocarbon group having more than 8 carbon atoms is preferred for improvement of heat resistance. When the number of the carbon atoms contained in the alicyclic hydrocarbon group is 6 or 7, the plastic optical fiber prepared is excellent in humidity resistance and flexibility. However, any methacrylic ester the ester moiety of which has a straight hydrocarbon group of at least 6 carbon atoms (e.g., n-octyl methacrylate, n-dodecyl methacrylate, etc.) does not improve the heat resistance. Preferably, the alicyclic hydrocarbon group has not more than about 20 carbon atoms, otherwise the mechanical strength of the optical fiber tends to be significantly decreased.

Deuterated methyl methacrylate includes $d_3-d_8$-analogs. Among them, $d_5$- and $d_8$-analogs are preferred.

When the deuterated methyl methacrylate polymer to be used as the core material contains less than 10% by weight of the methacrylic ester, the humidity and heat resistance of the optical fiber is not satisfactorily improved but is excellent in flexibility. On the other hand, the polymer which contains more than 40% by weight of the methacrylic ester, the mechanical strength, particularly flexibility of the optical fiber is not sufficiently improved but its heat resistance is excellent.

The polymer to be used as the core material according to the present invention may comprise $C_1-C_4$-alkyl acrylate and further comprise deuterated alkyl acrylate and deuterated styrene. The amount of these comonomers is kept at a minimum, and preferably less than 5% by weight so as to achieve the desirable humidity and heat resistance.

The cladding, which is the other essential component of the optical fiber, is made of a transparent polymeric material having a refractive index of at least 3% smaller than that of the core material. When the refractive index of the cladding material is less than 3% smaller than that of the core material, the light reflection by the cladding is small, and the attenuation of light transmission is great. Practically, the refractive index of the cladding material is 1.43 or less. Preferably, the cladding polymeric material is not crystalline but substantially amorphous and has good adhesiveness to the core material.

Examples of the transparent polymeric material are fluororesins and thermoplastic fluororubbers. Specific examples of the fluororesins are polymers of vinyl fluoride, vinylidene fluoride, trifluoroethylene, tetrafluoroethylene, hexafluoropropene, trifluoromethyl trifluorovinyl ether, perfluoropropyl trifluorovinyl ether, perfluoroisopropyl methacrylate and perfluoro-t-butyl methacrylate, copolymers of said fluoromonomers with alkyl methacrylates (e.g. methyl methacrylate, ethyl methacrylate) and their mixtures with polyalkyl methacrylates (e.g. polymethyl methacrylate, polyethyl methacrylate). Among them, vinylidene fluoride-tetrafluoroethylene copolymer, vinylidene fluoride-trifluoroethylene copolymer, vinylidene fluoride-tetrafluoroethylene-hexafluoropropene terpolymer, polyperfluoroisopropyl methacrylate, polyperfluoro-t-butyl methacrylate, etc. are preferred. In addition, the fluororesins include polymers of fluroalkyl methacrylate containing maleic anhydride or a methacrylic ester the ester moiety of which has an alicyclic hydrocarbon group of 6 to 20 carbon atoms. Specific examples of such polymers are poly-2,2,2-trifluoroethyl methacrylate, poly-1,1,1,3,3,3-hexafluoro-2-propyl methacrylate, poly-1,1-diethyl-2,2,3,4,4,4-hexafluoro-1-butyl methacrylate, poly-1-propyl-2,2,3,4,4,4-hexafluoro-1-butyl methacrylate, poly-1,1-diethyl-3-trifluoromethyl-2,2,4,4,4-pentafluorobutyl methacrylate, poly-2-trifluoromethyl-2,3,3,3-tetrafluoropropyl methacrylate, poly-1,1-dimethyl-2,2,3,3-tetrafluoropropyl methacrylate and poly-2-trifluoromethyl-3,3,3-trifluoropropyl methacrylate The term "thermoplastic fluororubbers" as herein used is intended to mean polymers which comprise soft segments of fluorine-containing rubbers and hard segments of fluorine-containing resins. These thermoplastic fluororubbers can be physically vulcanized in the fluorine-containing part of the at room temperature to demonstrate rubbery elasticity properties and perform as thermoplastics at temperatures over its melting point. Specific examples of the thermoplastic fluororubbers are those comprising, 10 to 95 parts by weight of the elastomeric polymer (soft) segment(s) having a molecular weight of from 30,000 to 1,200,000 selected from the group consisting of a vinylidene fluoride/hexafluoropropene or pentafluoropropene/tetrafluoroethylene polymer in a molar ratio of 45–90:5–50:0–35 and a perfluoro(alkyl vinyl ether)/tetrafluoroethylene/vinylidene fluoride polymer in a molar ratio of 15–75:0–85:0–85, and 5 to 90 parts by weight of the fluororesin (hard) segment(s) having a molecular weight of from 10,000 to 400,000 selected from the group consisting of a vinylidene fluoride/tetrafluoroethylene polymer in a molar ratio of 0:100 to 100:0 and an ethylene/tetrafluoroethylene in a molar ratio of 40–60:60–40. A typical example of such thermoplastic fluororubbers is "Dai-el" (trade mark) thermoplastic manufactured by Daikin Industries Ltd.

Other examples of the transparent polymeric material are transparent rubbers such as vinylidene fluoride-haxafluoropropene copolymer, vinylidene fluoride-pentafluoropropene copolymer, vinylidene fluoride-chlorotrifluoroethylene copolymer, etc. Among them, vinylidene fluoride-hexafluoropropene copolymer is preferred.

The polymer to be used as the core material may be prepared by a conventional polymerization procedure such as suspension polymerization or bulk polymerization. In these preparations, great care should be taken to prevent the contamination the polymer product by any foreign material. For instance, the suspension polymerization usually requires the use of water and a suspension stabilizer in large amounts so that these and such other foreign materials contained therein tend to be included in the polymer product produced. Foreign material may also contaminate the polymer product during the dehydration operation. For this reason, it is preferred to carry out the polymerization in air that has been cleaned to eliminate any floating material that had been contained therein. Operations, such as filtration, distillation and washing of the starting materials and/or the polymer product produced, are examples of the cleaning or purification operations applied.

The polymerization may be initiated by the use of a radical initiator, of which examples are azo compounds (e.g. 2,2'-azobis(isobutyronitrile), 1,1'-azobis(cyclohexanecarbonitrile), 2,2'-azobis(2,4-dimethylvaleronitrile), azobisisobutanol diacetate, azo-t-butane), organic peroxides (e.g. di-t-butyl peroxide, dicumyl peroxide, methyl ethyl ketone peroxide, di-t-butyl perphthalate, di-t-butyl peracetate, di-t-amyl peroxide), etc. The amount of the initiator is preferably from 0.001 to 1% by mole of the monomer to be polymerized.

In order to control the molecular weight of the polymer, a chain transfer agent may be added to the polymerization system. Specific examples of the chain transfer agent are t-butylmercaptan, n-butylmercaptan, n-octylmercaptan, n-dodecylmercaptan, etc. The amount of the chain transfer agent is usually not more than 1 mole % of the monomer.

The production of the polymeric material for the cladding material may be also accomplished in a conventional polymerization procedure. However, degree of care taken in the preparation of the core material is not required herein since the presence of contamination in the cladding does not affect the light transmission as greatly as in case of the core material. Usually, the monomer of the cladding material is filtrated before polymerization.

In one of the preferred procedures for preparation of the optical fiber of the invention, the polymer for the core material is produced by the process comprising a continuous bulk polymerization monomers at an elevated temperature and followed by a subsequent step of continuous elimination of volatile materials containing unreacted monomers from the polymerization product, and product used in the manufacture of the optical fiber. In another preferred procedure, the polymer for the core material is produced by bulk polymerization, and subsequently the produced polymer and the polymeric material of the cladding material are co-extruded to form an integral body extruded product comprising the core and cladding respectively.

The weight ratio of the core material and the cladding material is from about 70:30 to 98:2, preferably from about 80:20 to 95:5. The optical fiber of the invention has usually a diameter of from about 0.15 mm to 1.5 mm, preferably from about 0.20 to 1.0 mm.

The optical fiber of the invention comprises the core of the specific polymer and the cladding of the specific polymeric material so that it can be used in a wider temperature range than the conventional plastic optical fiber and has excellent heat resistance and flexibility. Since the optical fiber is stable even at a high temperature over 110° C., it can be applied to automobiles, trains, vessels, aircrafts, robots, etc. Further, it will have wide application in communication in premises or buildings.

Practical and presently preferred embodiments of the present invention are shown in the following Examples wherein parts and % are by weight unless otherwise indicated.

In these examples, the attenuation of light transmission was measured as follows:

As the illuminant, a halogen-tungsten lamp was employed. Using a diffraction grating spectrophotometer, the intensities of the outputs from the optional fiber to be tested and from the standard optical fiber at a wavelength of 650 nm, 840 nm were read off by means of silicone photodiode. The attenuation of light transmission ($\alpha$) was calculated according to the following equation:

$$(db/Km = 10/L \log(I/I_o)$$

wherein L is the length of the optical fiber (Km), $I_o$ is the intensity of light at the entrance and I is the intensity of light at the exit.

The heat resistance of the optical fiber was evaluated by heating the optical fiber at a predetermined temperature for a predetermined period of time and comparing the optical transmission loss before and after heating.

The humidity resistance of the optical fiber was tested by immersing it in a constant temperature bath kept at a predetermined temperature for 24 hours, and comparing attenuation of light transmission measured before and after the water treatment. The measurement of attenuation of light transmission after the water treatment was completed within 30 minutes.

The flexibility of the optical fiber was evaluated by winding the optical fiber around a rod and determining the minimum radius (r) of the rod at which the optical fiber was broken.

EXAMPLE 1

To deuterated methyl methacrylate-$d_8$ purified by distillation in a closed polymerization reactor containing substantially no oxygen (70 parts), cyclohexyl methacrylate (28 parts), methyl acrylate (2 parts), azo-t-butane (0.14 part) and n-butylmercaptan (0.18 part) were added by distillation, and thoroughly mixed. The monomeric mixture was then bulk polymerized at 130° C. for 48 hours, gradually heated to 180° C. and kept at the same temperature for 24 hours to complete the polymerization to obtain a core material. Intrinsic viscosity [$V$] (25° C., chloroform), 0.60. Refractive index ($n_D^{20}$), 1.49.

The thus produced polymer was drawn at 210° C. to form a fiber of 0.85 mm in diameter as a core, while a 3.0% solution of a copolymer of 2-trifluoromethyl-3,3,3-trifluoropropyl methacrylate and methyl methacrylate in a molar ration of 90:10 (refractive index, 1.40; melt viscosity at 220° C., $1.0 \times 10^4$ poise) in hexafluoro-m-xylene was coated on the surface of the core fiber to form an optical fiber having a cladding thickness of 0.1 mm.

The attenuation of light transmission at a wavelength of 840 nm as measured at 25° C. was 110 dB/Km.

After kept standing at relative humidity of 90% and 40° C. for 24 hours, the attenuation of light transmission was 140 dB/Km.

EXAMPLES 2 AND 3

In the same manner as in Example 1 but using polymers as shown in Table 1, optical fibers of 0.85 to 0.75 mm in diameter were prepared. The attenuations at a wavelength of 840 nm before and after the humidity resistance test were shown in Table 1. The conditions in the test were as follows:

|  | Example 2 | Example 3 |
|---|---|---|
| Relative humidity (%) | 75 | 90 |
| Temperature (°C.) | 50 | 50 |

From such results, it is understood that the optical fibers have good humidity resistance.

sic viscosity [η] (25° C., chloroform), 0.90. Refractive index, 1.49.

The thus produced polymer was charged in a vented extruder kept at 255° C. The polymer was extruded from the central portion of a coextruder die kept at 235° C. to form a strand of 1 mm in diameter as a core, while 2-trifluoro-3,3,3-trifluoropropyl methacrylate-maleic anhydride-methyl acrylate terpolymer (molar ratio of 75:20:5; refractive index, 1.40; [η] (25° C., chloroform), 0.70) was melt coated on the surface of the core strand to form a strand in a core-cladding structure. The weight ratio of the core portion and the cladding portion was 90:10.

The attenuations of light transmission at wavelength of 650 nm and 840 nm as measured at 25° C. were 90 dB/Km and 110 dB/Km, respectively. The attenuations at wavelength of 650 nm and 840 nm after heated for 6 hours at 110° C. were 90 dB/Km and 120 dB/Km, respectively. These results mean that the optical fiber has good heat resistance. The flexibility of the optical fiber was r=5 mm. Further, after humidity resistance test under conditions of relative humidity of 90% and a temperature of 50° C., attenuations at wavelength of 650

TABLE 1

| Example No. | Polymer for core Monomers (%) | [η] (25° C., CHCl$_3$) | Refractive index | Polymeric material for cladding Monomers (mol %) | Refractive index | Attenuation of light transmission (dB/km, 840 nm) Initial | After humidity resistance test |
|---|---|---|---|---|---|---|---|
| 2 | 4-Methylcyclohexyl methacrylate/ Deuterated methyl methacrylate-d$_8$/ Butyl acrylate (15:83:2) | 0.62 | 1.49 | Vinylidene fluoride/ Hexafluoropropene Copolymer(*1) | 1.39 | 120 | 170 |
| 3 | 2,6-Dimethylcyclohexyl methacrylate/ Deuterated methyl methacrylate-d$_8$/ Methyl acrylate (10:98:2) | 0.71 | 1.49 | Vinylidene fluoride/ Tetrafluoroethylene (70:30) | 1.40 | 150 | 190 |

Note:
(*1)Dai-el G 901 manufacture by Daikin Industries Ltd.

EXAMPLE 4

A monomeric mixture of bornyl methacrylate purified by distillation under reduced pressure (25 parts), deuterated methyl methacrylate-d$_8$ (72 parts) and methyl acrylate (3 parts) containing n-dodecylmercaptan (0.05 part) and 2,2'-azobis-(2,4-dimethylvaleronitrile) (0.025 part) was prepared in the absence of oxygen, charged in a reactor kept at 150° C. and subjected to prepolymerization with a retention time of 8 hours. The prepolymerized mixture was then introduced into a screw conveyor kept at 200° C. and polymerized with a retention time of 2 hours to obtain a copolymer. Intrinnm and 840 nm were 100 dB/Km and 190 dB/Km, respectively.

EXAMPLES 5 to 10

In the same manner as in Example 4 but using polymers as shown in Table 2 wherein MMA, VdF, TFE and HFP stand for methyl methacrylate, vinylidene fluoride, tetrafluoroethylene and hexafluoropropene, respectively, optical fibers of from 0.85 to 0.75 mm in diameter were prepared. Their attenuations of light transmission before and after heating and their flexibilities are shown in Table 2.

TABLE 2

| Example No. | Polymer for core Monomers (%) | [η] (25° C., CHCl$_3$) | Refractive index | Polymeric material for cladding Monomers (%) | Refractive index (20° C.) | Attenuation of light transmission (dB/Km) Room Temp. 650 nm | 840 nm | After heating (°C. × Hr) 650 nm | Humidity resistance RH = 90% 840 nm | Flexibility (mm) |
|---|---|---|---|---|---|---|---|---|---|---|
| 5 | Fenchyl methacrylate/ Deuterated MMA-d$_8$/ Methyl acrylate (15:83:2) | 0.96 | 1.49 | Vdf/TFE (80:20) | 1.41 | 100 | 120 | 110 (125° C. × 6 hrs.) | 130 | 15 |
| 6 | Adamantyl methacrylate/Deuterated MMA-d$_8$/ Butyl acrylate (10:88:2) | 0.70 | 1.50 | Vdf/TFE/ HFP (60:35: 5) | 1.38 | 70 | 80 | 110 (110° C. × 3 hrs.) | 200 | 8 |

TABLE 2-continued

| Example No. | Polymer for core | | | Polymeric material for cladding | | Attenuation of light transmission (dB/Km) | | | Humidity resistance RH = 90% 840 nm | Flexibility (mm) |
|---|---|---|---|---|---|---|---|---|---|---|
| | Monomers (%) | [η] (25° C., CHCl₃) | Refractive index | Monomers (%) | Refractive index (20° C.) | Room Temp. | | After heating (°C. × Hr) 650 nm | | |
| | | | | | | 650 nm | 840 nm | | | |
| 7 | 1-Menthyl methacrylate/Deuterated MMA-d₈/Methyl acrylate (40:58:2) | 0.60 | 1.49 | Dai-el G501(*1) | 1.36 | 150 | 210 | 150 (120° C. × 24 hrs.) | 210 | 100 |
| 8 | 1-Menthyl methacrylate/Deuterated MMA-d₈/Ethyl acrylate (25:73:2) | 0.65 | 1.50 | Dai-el Thermoplastic T-530(*2) | 1.39 | 90 | 120 | 90 (100° C. × 24 hrs.) | 120 | 15 |
| 9 | Adamantyl methacrylate/Deuterated MMA-d₅/Methyl acrylate (10:88:2) | 0.90 | 1.50 | Vdf/TFE (80:20) | 1.41 | 75 | 90 | 80 (90° C. × 24 hrs.) | 250 | 20 |
| 10 | Bornyl methacrylate/Deuterated MMA-d₈ Methyl acrylate (10:80:5) | 0.70 | 1.49 | (Note*3) | 1.43 | 75 | 90 | 80 (100° C. × 4 hrs.) | 210 | 5 |

Note
(*1)VdF/TFE copolymer manufactured by Daikin Industries Ltd. Coated as a 20% solution in ethyl acetate.
(*2)Thermoplastic fluororubber manufactured by Daikin Industries Ltd.
(*3)Bornyl methacrylate/1-Propyl-2,2,3,4,4,4-hexafluoro-1-butyl methacrylate/Methyl acrylate (20:77:3)

COMPARATIVE EXAMPLE 1

In the same manner as in Example 1 but using deuterated methyl methacrylate-d₈-methyl acrylate copolymer (molar ratio, 98:2; [η] (25° C., chloroform), 0.70; refractive index, 1.49) as a core material, an optical fiber was prepared. The attenuation of light transmission at wavelength of 840 nm as measured at 25° C. was 90 dB/Km. The attenuation after kept at relative humidity of 90% and 50° C. for 24 hours was 750 dB/Km.

COMPARATIVE EXAMPLES 2 and 3

In the same manner as in Examples 2 and 3 but using the same core material as employed in Comparative Example 1, optical fibers were prepared. The attenuations of light transmission at wavelength of 840 nm as measured at 25° C. were 120 dB/Km and 90 dB/Km, respectively. The attenuations after kept at relative humidity of 90% and 50° C. for 24 hours were 780 dB/Km and 600 dB/Km, respectively.

COMPARATIVE EXAMPLE 4

In the same manner as in Example 4 but using a copolymer of bornyl methacrylate (1 part), deuterated methyl methacrylate-d₈ (96 parts) and methyl acrylate (3 parts) as a core material and the same copolymer as employed in Example 1 as a cladding material, an optical fiber of about 0.85 mm in diameter was prepared. The flexibility of the optical fiber was r=5 mm. The attenuation of light transmission at wavelength of 650 nm as measured at 25° C. were 60 dB/Km. After heated for one hour at 110° C., the attenuation was more than 1,000 dB/Km and the flexibility was deteriorated. The attenuation of light transmission at wavelength of 840 nm as measured at 25° C. after kept at relative humidity of 90% was 750 dB/Km.

An optical fiber having a core made of polybenzyl methacrylate or poly-n-octyl methacrylate had attenuation of more than 1,000 dB/Km after heated at 100° C. for 2 hours.

COMPARATIVE EXAMPLE 5

In the same manner as in Example 4 but using a copolymer of deuterated methyl methacrylate (97 parts) and methyl acrylate (3 parts) as a core material and the same cladding material as employed in Example 4, an optical fiber of 0.85 mm in diameter was prepared. The flexibility of the optical fiber was r=5 mm. Attenuations of light transmission at wavelength of 650 nm and 850 nm as measured at 25° C. were 60 dB/Km and 90 dB/Km, respectively. The attenuation at wavelength of 650 nm after heated at 100° C. for one hour was more than 1,000 dB/Km. The attenuation at wavelength of 840 nm as measured at 25° C. after kept at relative humidity of 70% was 550 dB/Km.

What is claimed is:

1. An optical fiber with low attenuation of light transmission and good heat and humidity resistance comprising a core and a cladding, wherein the core comprises a core polymer comprising units of deuterated methyl methacrylate and 10 to 40% of units of a methacrylic ester, the ester moiety of which has an alicyclic hydrocarbon group of from 6 to 20 carbon atoms, and the cladding comprises a transparent polymeric material having a refractive index at least 3% smaller than that of the core polymer.

2. An optical fiber according to claim 1, wherein the methacrylate ester the ester moiety of which has an alicyclic hydrocarbon group of from 6 to 20 carbon atoms is selected from the group consisting of cyclohexyl methacrylate, methylcyclohexyl methacrylate, dimethylcyclohexyl methacrylate, bornyl methacrylate, fenchyl methacrylate, 1-menthyl methacrylate, adamantyl methacrylate and dimethyladamantyl methacrylate.

3. An optical fiber according to claim 2, wherein the deuterated methyl methacrylate is selected from the group consisting of methyl methacrylate-d₈ and methyl methacrylate-d₅.

4. An optical fiber according to claim 1, wherein the transparent polymeric material is selected from the group consisting of vinylidene fluoride-tetrafluoroethylene copolymer, vinylidene fluoride-trifluoroethylene copolymer, vinylidene fluoride-tetrafluoroethylene-hexafluoropropene terpolymer, vinylidene fluoride-hexafluoropropene copolymer, vinylidene fluoride-pentafluoropropene copolymer, vinylidene fluoride-chlorotrifluoroethylene copolymer, poly-2,2,2-trifluoroethyl methacrylate, poly-1,1,1,3,3,3-hexafluoro-2-propyl methacrylate, poly-1,1-diethyl-2,2,3,4,4,4-hexafluoro-1-butyl methacrylate, poly-1-propyl-2,2,3,4,4,4-hexafluoro-1-butyl methacrylate, poly-1,1-diethyl-3-trifluoromethyl-2,2,4,4,4-pentafluorobutyl methacrylate, poly-2-trifluoromethyl-2,3,3,3-tetrafluoropropyl methacrylate, poly-1,1-dimethyl-2,2,3,3-tetrafluoropropyl methacrylate and poly-2-trifluoromethyl-3,3,3-trifluoropropyl methacrylate.

5. An optical fiber according to claim 1, wherein the transparent polymeric material is a thermoplastic fluororubber.

6. An optical fiber according to claim 1, wherein the deuterated methyl methacrylate is $d_3$–$d_8$-analogs.

7. An optical fiber according to claim 1, wherein the core polymer further comprises less than 5% by weight of a comonomer selected from $C_1$–$C_4$ alkyl acrylate, deuterated alkyl acrylate, deuterated styrene or mixtures thereof.

8. An optical fiber of claim 1, wherein the reflective index of the transparent polymeric material is 1.43 or less.

9. An optical fiber of claim 1, wherein the transparent polymeric material is substantially amorphous.

10. An optical fiber of claim 1, wherein the weight ratio of the core polymer to the transparent polymeric material is from about 70:30 to 98:2.

11. An optical fiber of claim 1, wherein the weight ratio of the core material to the transparent polymeric material is from about 80:20 to 95:5.

12. An optical fiber of claim 1, which comprises a diameter of from about 0.15 mm to 1.5 mm.

13. An optical fiber of claim 1, which comprises a diameter of from about 0.20 mm to 1.0 mm.

* * * * *